US010922107B2

(12) United States Patent
Ogata

(10) Patent No.: US 10,922,107 B2
(45) Date of Patent: *Feb. 16, 2021

(54) APPARATUS AND METHOD FOR REALIZING RUNTIME SYSTEM FOR PROGRAMMING LANGUAGE

(71) Applicant: International Business Machines Corporation, Armonk, NY (US)

(72) Inventor: Kazunori Ogata, Hachioji (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/357,371

(22) Filed: Mar. 19, 2019

(65) Prior Publication Data
US 2019/0213024 A1 Jul. 11, 2019

Related U.S. Application Data

(63) Continuation of application No. 15/837,314, filed on Dec. 11, 2017, now Pat. No. 10,331,465, which is a (Continued)

(30) Foreign Application Priority Data

Sep. 16, 2014 (JP) .................. 2014-188177

(51) Int. Cl.
G06F 9/455 (2018.01)
G06F 9/46 (2006.01)
(Continued)

(52) U.S. Cl.
CPC ............ *G06F 9/45504* (2013.01); *G06F 9/30* (2013.01); *G06F 9/46* (2013.01); *G06F 8/10* (2013.01); *G06F 8/20* (2013.01); *G06F 9/45512* (2013.01)

(58) Field of Classification Search
None
See application file for complete search history.

(56) References Cited

U.S. PATENT DOCUMENTS 6,138,269 A 10/2000 Ball et al.
7,971,194 B1 6/2011 Gilboa
(Continued)

FOREIGN PATENT DOCUMENTS

JP 05274151 A 10/1993
JP 06103075 A 4/1994
(Continued)

OTHER PUBLICATIONS

Decision to Grant a Patent, Application No. 2014-188177. dated Apr. 28, 2016. Translated Jun. 14, 2016. 6 pages.
(Continued)

*Primary Examiner* — Qing Chen
(74) *Attorney, Agent, or Firm* — Stosch Sabo

(57) ABSTRACT

Apparatus, method, and a program for causing a computer to function as an apparatus, for realizing a runtime system for programming language. The apparatus includes a storage unit for storing a first class that is an existing class in the object-oriented programming language, a second class that is a class that includes a member accessible from outside of the first class and is a class which is specialized for specific use; and a processing unit for performing processing using the second class with a predetermined instruction in software that realizes the runtime system, and performing processing using the first class with an instruction to check an identity of the second class in a user program product that is executed by the runtime system.

13 Claims, 9 Drawing Sheets

Related U.S. Application Data continuation of application No. 14/853,279, filed on Sep. 14, 2015, now Pat. No. 9,921,858.

(51) Int. Cl.
  *G06F 9/30* (2018.01)
  *G06F 8/10* (2018.01)
  *G06F 8/20* (2018.01)

(56) References Cited

U.S. PATENT DOCUMENTS

| | | |
|---|---|---|
| 8,370,531 B1 | 2/2013 | Foti |
| 9,921,858 B2 | 3/2018 | Ogata |
| 9,934,128 B2 | 4/2018 | Berk et al. |
| 10,120,796 B2 | 11/2018 | Moser |
| 2008/0313612 A1 | 12/2008 | Mikan et al. |
| 2009/0150863 A1 | 6/2009 | Guo et al. |
| 2016/0196114 A1 | 7/2016 | Ogata |
| 2018/0157506 A1 | 6/2018 | Ogata |

FOREIGN PATENT DOCUMENTS

| | | |
|---|---|---|
| JP | 06251163 A | 9/1994 |
| JP | 0713766 A | 1/1995 |
| JP | 0926873 A | 1/1997 |
| JP | 09190349 A | 7/1997 |
| JP | 10232769 A | 9/1998 |
| JP | 1185492 A | 3/1999 |
| JP | 11073320 A | 3/1999 |
| JP | 2000172604 A | 6/2000 |
| JP | 2002259135 A | 9/2002 |
| JP | 2004110274 A | 4/2004 |
| JP | 2005215830 A | 8/2005 |
| JP | 2007012066 A | 1/2007 |
| JP | 2010186362 A | 8/2010 |
| JP | 2011233171 A | 11/2011 |
| JP | 2014225077 A | 12/2014 |

OTHER PUBLICATIONS

JP Office Action; Notification of Reasons for Refusal, Application No. 2014-188177. dated Mar. 8, 2016. Translated Jun. 14, 2016. 4 pages.

Vanderhart et al., "Data in Clojure", Chapter 4, Apress, Practical Clojure, 2010, 21 pages.

IBM, List of IBM Patents or Patent Applications Treated as Related, Mar. 18, 2019, 2 pages.

FIG. 3A
java.lang.String

| classPointer |
|---|
| offset |
| length |
| value |
| hashCode |
| (padding) |

←— 32bit —→ char[] for value

| classPointer | |
|---|---|
| size | |
| | |
| | |
| | |
| | |

FIG. 3B
Variant #1

| classPtr#1 | | | |
|---|---|---|---|
| hashCode | | | |
| Len | 'a' | 'b' | 'c' |
| 'd' | | | |

←— 32bit —→

FIG. 3C
Variant #2

| classPtr#2 | | | |
|---|---|---|---|
| hashCode | | | |
| Len | 'a' | 'b' | 'c' |
| 'd' | 'e' | 'f' | 'g' |
| 'h' | 'i' | | |

←— 32bit —→

FIG. 3D
Variant #3

| classPtr#3 | | | |
|---|---|---|---|
| hashCode | | | |
| Len | 'a' | 'b' | 'c' |
| 'd' | 'e' | 'f' | 'g' |
| 'h' | 'i' | 'j' | 'k' |
| 'l' | 'm' | 'n' | 'o' |
| 'p' | | | |

←— 32bit —→

FIG. 3E
Variant #4

| classPtr#4 | | | |
|---|---|---|---|
| hashCode | | | |
| Len | bits | | |
| | | | |
| | | | |
| | | | |
| | | | |

←— 32bit —→

FIG. 3F
Variant #5

| classPtr#5 | | | |
|---|---|---|---|
| hashCode | | | |
| Len | -1 | 23 | 45 |
| 6. | 78 | | |

←— 32bit —→

FIG. 3G
Variant #6

| classPtr#6 | | | |
|---|---|---|---|
| hashCode | | | |
| Len | +8 | 1- | 3- |
| 12 | 34 | -6 | 67 |
| 8 | | | |

←— 32bit —→

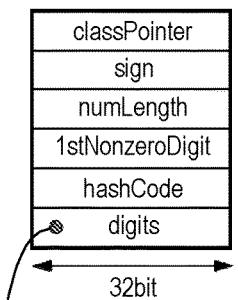
FIG. 4A
java.math.BigInteger
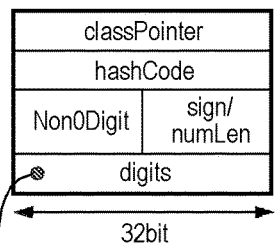
FIG. 4B
Variant #1
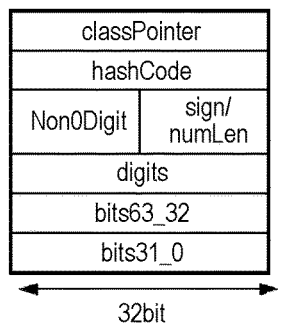
FIG. 4C
Variant #2
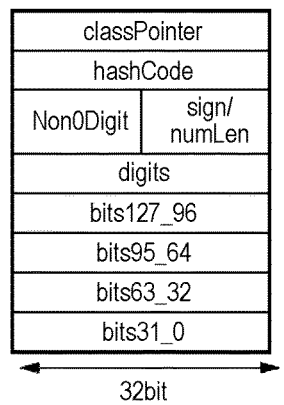
FIG. 4D
Variant #3
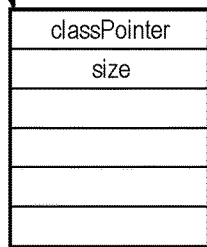
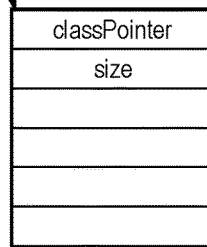

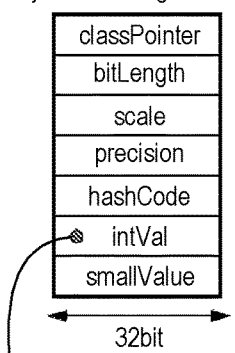
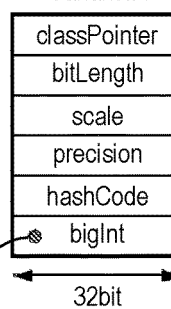
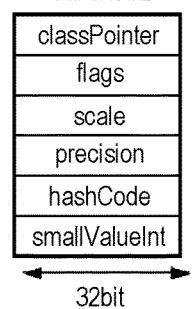
FIG. 5A
java.math.BigDecimal
FIG. 5B
Variant #1
FIG. 5C
Variant #2
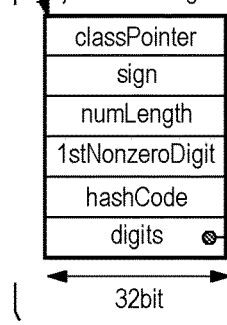
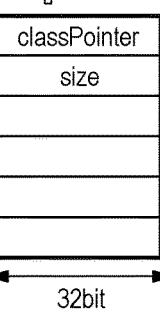
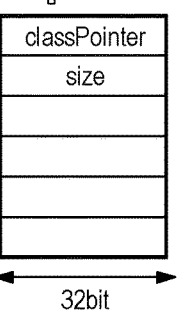

|  | DayTrader (after 90min run) | SPECjEnterprise (after 90min run) |
|---|---|---|
| TOTAL LIVE HEAP SIZE | 562 MB | 373 MB |
| TOTAL ESTIMATED REDUCTION | 59.6 MB | 31.4 MB |
| ESTIMATED REDUCTION OBTAINED BY VARIANT #1 | 22.5 MB | 4.0 MB |
| ESTIMATED REDUCTION OBTAINED BY VARIANT #2 | 1.0 MB | 4.9 MB |
| ESTIMATED REDUCTION OBTAINED BY VARIANT #3 | 36.0 MB | 23.0 MB |

APPARATUS AND METHOD FOR REALIZING RUNTIME SYSTEM FOR PROGRAMMING LANGUAGE

FIELD OF THE INVENTION

The present invention relates to an apparatus and a method for realizing a runtime system for a programming language. More particularly, the present invention relates to an apparatus and a method for realizing a runtime system for a class-based object-oriented programming language.

BACKGROUND

In a class-based object-oriented programming language, implementation of an object is determined according to the class definition of the relevant object. Technology relating to classes in a class-based object-oriented programming language is known, as described in official gazettes.

Japanese Patent Application JP11-85492A discloses technology according to which, first, a subclass creation unit creates a superclass including an attribute and a method that are common to a selected plurality of objects. Next, common domains of objects designated for a subclass are retrieved from a domain keyword database to create a list of domain names, and then, by means of objects selected from a non-common portion, the subclass creation unit creates a subclass from which attributes and methods used in the superclass have been deleted, and thereafter combines the created subclass with the superclass and deletes the selected objects from the non-common portion. Furthermore, a subclass model registration unit gives the subclass structure (combination model of the superclass and subclass) created by the subclass creation unit the same name as the superclass and registers the subclass structure in a domain model database as a domain model.

Thereafter, at a subclassing combination diagram generation unit, an object group of subclass structures created by the subclass creation unit and an object group of non-common portions for which subclassing was not performed are combined with a common portion extracted by a similar portion extraction unit based on the respective related data thereof, and an object inclusion diagram having a subclassing structure is created.

Japanese Patent Application JP07-13766A discloses technology in which SOMobjects, an IBM system object model product is an object-oriented framework, and the framework is constituted by classes and objects belonging to the classes. In SOMobjects, a class is itself an object, and has all the characteristics of an object. A class has the additional characteristic of including information relating to a method or behavior (action) to which each object in the relevant class responds. In a case where an object includes a process code for a certain method name, the object is regarded as an object that responds to the relevant method. When an object in a class responds to a certain method, the class is regarded as supporting the relevant method. The term "a method is supported by a certain class" refers to a method that is explicitly defined for the class and a method that is inherited from a class that is a parent class of the relevant class. Further, an object responds only to a method that is supported by the class to which the object belongs.

Japanese Patent Application JP06-103075A discloses technology according to which, by expanding an object-oriented programming language and subclassing without indicating inheritance of implementation from a parent class, a modifier that indicates inheritance of an interface from a parent class of a class is provided for each class. Japanese Patent Application JP2011-233171A discloses a class loader adapted to load a class that is associated with an application. Japanese Patent Application JP06-251163A discloses an object model display apparatus configured so that, when an instruction of a user that was input using an input device is interpreted by an input interpretation unit and an instruction is sent to a display unit and is displayed in a graph structure on a display while referring to model information stored in an object model storage unit via the display unit, a class is displayed as a node by a class node display unit, the relation is displayed as a branch by a related branch display unit, a member belonging to the class is displayed by a member display unit, and nodes corresponding to respective classes in a generalization/specialization relation, for example, respective parent classes and child classes, are displayed so that the parent class is included in the node of the child class by a generalized class node display unit. Further, technology that optimizes a program by specializing is also known, as described in official gazettes (for example, see Japanese Patent Applications JP2002-259135A and JP2005-215830A).

Japanese Patent Application JP2002-259135A discloses a compiler that includes: an influence degree analysis unit that analyzes how much the execution speed of a program that is a compilation object can be improved by fixing a parameter of a predetermined instruction in the program in a specific state; a specialization data selection unit that obtains statistics regarding the occurrence frequency in each state that the parameter of the instruction that is analyzed by the influence degree analysis unit can take in a case where the program was executed, and determines which state to fix the parameter of the instruction in based on the obtained statistical information; and a specialization processing unit that, based on the processing results obtained by the influence degree analysis unit and the specialization data selection unit, generates a specialized path that fixes the parameter of the predetermined instruction in a specific state in the program.

Japanese Patent Application JP2005-215830A discloses an optimization compiler that includes: an update instruction detection unit that detects an update instruction for updating the contents of a variable or a storage region designated by the variable in a program to be optimized; an instruction string detection unit that detects an instruction string for executing different processing in accordance with the contents of the variable or the storage region when control is transferred by a control transfer instruction that transfers control to another instruction string in the target program; an instruction string compiling unit that optimizes the detected instruction string for processing in a case where the contents of the variable or the storage region are predetermined specific contents and compiles the instruction string; and a setting instruction generation unit that, during a period from an update instruction to a control transfer instruction in the target program, generates a setting instruction that is executed in a case where the contents of the variable or the contents of the storage region are the specific contents and that sets a transfer destination address of the control transfer instruction to the address of the instruction string that was optimized by the instruction string compiling unit.

SUMMARY OF THE INVENTION

To achieve the aforementioned object, the present invention provides an apparatus for realizing a runtime system for a class-based object-oriented programming language, the apparatus including: a storage unit for storing a first class that is an existing class in the object-oriented programming language, a second class that is a class that includes a member that is accessible from outside of the first class and that is a class which is specialized for a specific use; and a processing unit for performing processing using the second class in accordance with a predetermined instruction in software that realizes the runtime system, and performing processing using the first class in accordance with an instruction to check an identity of the second class in a user program that is executed by the runtime system.

The present invention also provides an apparatus for realizing a Java® runtime system, the apparatus including: a storage unit for storing a first class that is an existing class in Java®, and a second class that is a class that includes a member that does not have a private attribute of the first class and is a class in which a size of a field of the first class is reduced in accordance with a value stored in the first class; and a processing unit for processing a predetermined instruction in software that realizes the runtime system using the second class, and for performing processing that returns information that the first class holds in accordance with any one of an "instanceof" bytecode and a "checkcast" bytecode that take an instance of the second class as an argument and a "Class.getName( )" method that takes the second class as an argument in a user program that is executed by the runtime system.

In addition, the present invention provides a method executed by a computer for realizing a runtime system for a class-based object-oriented programming language, including the steps of: preparing a first class that is an existing class in the object-oriented programming language, and a second class that is a class that includes a member that is accessible from outside of the first class and that is a class which is specialized for a specific use; performing processing using the second class in accordance with a predetermined instruction in software that realizes the runtime system; and performing processing using the first class in accordance with an instruction to check an identity of the second class in a user program that is executed by the runtime system.

Furthermore, the present invention provides a program for causing a computer to function as an apparatus for realizing a runtime system for a class-based object-oriented programming language, wherein the program causes the computer to function as a storage unit for storing a first class that is an existing class in the object-oriented programming language, and a second class that is a class that includes a member that is accessible from outside of the first class and that is a class which is specialized for a specific use; and a processing unit for performing processing using the second class in accordance with a predetermined instruction in software that realizes the runtime system, and performing processing using the first class in accordance with an instruction to check an identity of the second class in a user program that is executed by the runtime system.

According to the present invention, the implementation of an object can be made more efficient while retaining compatibility with existing software.

BRIEF DESCRIPTION OF THE DRAWINGS

FIG. 3A illustrates the implementation of the existing java.lang.String class, a "value" field points to a char type array, and a 16-bit character string of an arbitrary length is stored in the array;

FIG. 3B, Variant #1, illustrates the implementation of a field with a size of 32 bits×2 and to store "length" (described as "Len" in the figure) and "a", "b", "c", "d" in this field;

FIG. 3C, Variant #2, illustrates the implementation of a field with a size of 32 bits×4 and to store "length" (described as "Len" in the figure) and "a", "b", "c", "d", "e", "f", "g", "h", "i" in this field;

FIG. 3D, Variant #3, illustrates the implementation of a field with a size of 32 bits×6 and to store "length" (described as "Len" in the figure) and "a", "b", "c", "d", "e", "f", "g", "h", "i", "j", "k", "l", "m", "n", "o", "p" in this field;

FIG. 3E, Variant #4, illustrates the implementation of a field with a size of 32 bits×6 is prepared and to store "length" (described as "Len" in the figure) and the number of bits ("bits") in the 16 bits in the first half of the first field and to store binary data corresponding to a character string from the 16 bits in the second half of the first field to the sixth field;

FIG. 3F, Variant #5, illustrates the implementation of field with a size of 32 bits×2 and to store "length" (described as "Len" in the figure) and "−1", "23", "45", "6.", "78" in this field;

FIG. 3G, Variant #6, illustrates the implementation of a field with a size of 32 bits×4 and to store "length" (described as "Len" in the figure) and "+8", "1−", "3−", "12", "34", "−5", "67", "8" in this field;

In FIG. 4A, illustrates the implementation of a "digits" field points to an int type array, and a bit string of an arbitrary length is stored in the array;

FIG. 4B, Variant #1, illustrates the implementation of a "numLength" (described as "numLen" in the figure) and "1stNonzeroDigit" (described as "Non0Digit" in the figure) in a 32-bit size field;

FIG. 4C, Variant #2, illustrates the implementation of two 32-bit size fields and store the $63^{rd}$ to $32^{nd}$ bits in the first field and store the $31^{st}$ to $0^{th}$ bits in the second field;

FIG. 4D, Variant #3, illustrates the implementation of four 32-bit size fields, storing the $127^{th}$ to $96^{th}$ bits in the first field, storing the $95^{th}$ to $64^{th}$ bits in the second field, storing the $63^{rd}$ to $32^{nd}$ bits in the third field, and store the $31^{st}$ to $0^{th}$ bits in the fourth field;

FIG. 5A, illustrates the implementation of "intVal" field that shows a bit string that cannot be represented by a long type points and a "smallValue" field that shows a bit string that can be represented by a long type;

FIG. 5B, Variant #1, illustrates the implementation of storing a bit string having a bit length that is equal to or greater than 32;

FIG. 5C, Variant #2, illustrates the implementation of storing a bit string having a bit length shorter than 32;

FIG. 9 is a view showing effects obtained by the embodiment of the present invention.

DETAILED DESCRIPTION OF THE PREFERRED EMBODIMENTS

Hereunder, an embodiment of the present invention is described in detail with reference to the accompanying drawings.

Figure 1:
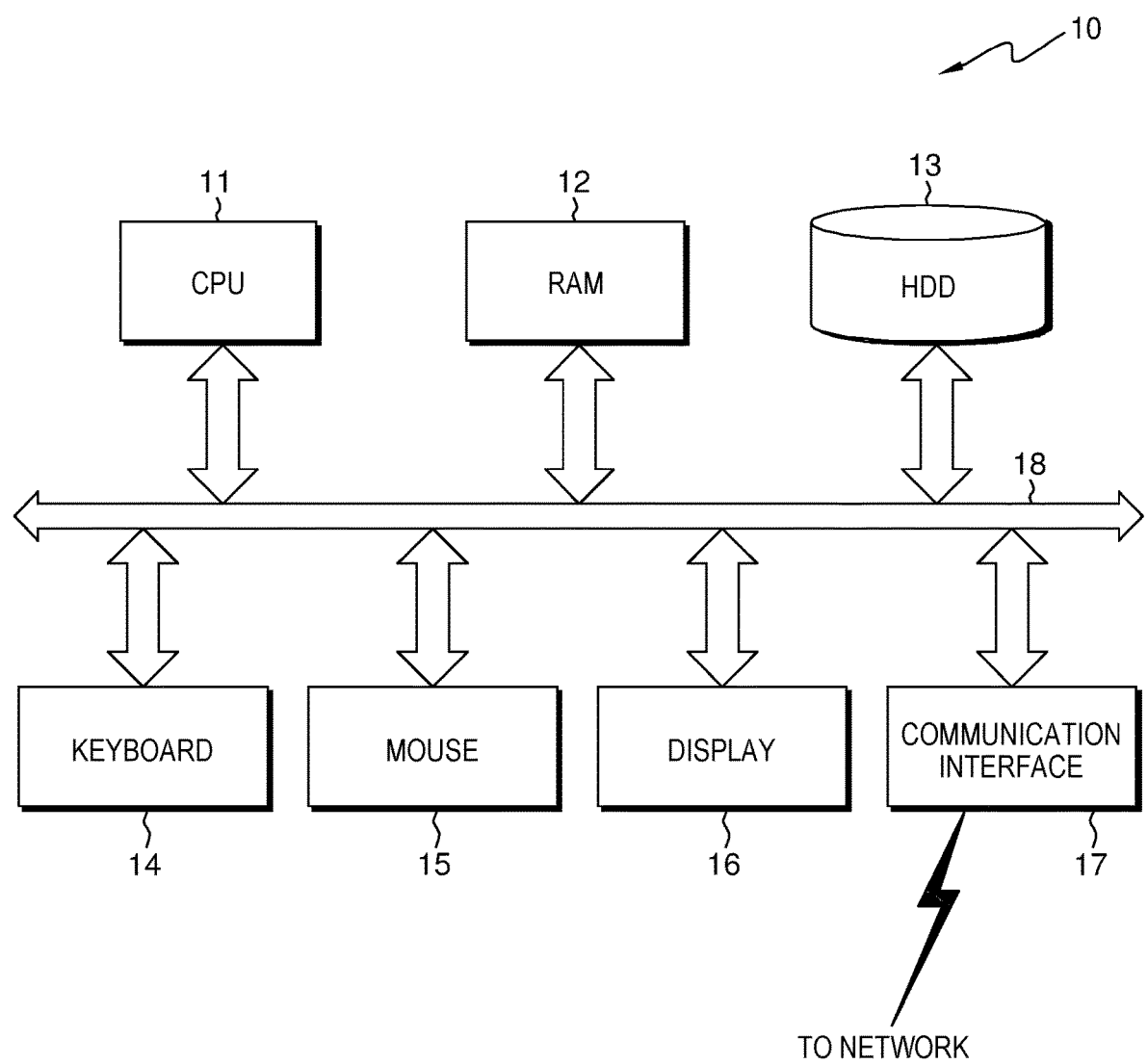
FIG. 1 is a view illustrating an example of the hardware configuration of a computer in an embodiment of the present invention.

FIG. 1 is a view illustrating an example of the hardware configuration of a computer 10 in the present embodiment. As shown in FIG. 1, the computer 10 is constituted by connecting a CPU 11, a RAM (random access memory) 12, a HDD (hard disk drive) 13, a keyboard 14, a mouse 15, a display 16 and a communication interface 17 using a system bus 18.

The CPU 11 is preferably based on a 32-bit or 64-bit architecture, although is not limited thereto. Examples of such architecture that are favorably used include POWERB™ and POWER7™ from IBM Corporation, Core™ i3, Core™ i5, Core™ i7, and Xeon® from Intel Corporation, and Athlon™, Phenom™, and Sempron™ from Advanced Micro Devices Incorporated. The RAM 12 is preferably a memory that has a capacity of 8 GB or more, and more preferably a capacity of 16 GB or more, although the RAM 12 is not limited thereto. The HDD 13 stores an OS (operating system). The OS can be an arbitrary OS that is adapted for the CPU 11. For example, Linux®, AIX® from IBM Corporation, Windows® 7, Windows® 8, or Windows® 2003 server from Microsoft Corporation, and Mac OS® from Apple Incorporated can be used. The HDD 13 also stores a program for causing the computer 10 to operate as a webserver, such as WebSphere® application server from IBM Corporation. The program is loaded into the RAM 12 upon startup of the computer 10.

The keyboard 14 and mouse 15 are used for operating a graphic object such as an icon, a taskbar or a text box that is displayed on the display 16 in accordance with a graphic user interface that the OS provides. The display 16 is preferably a 32-bit true color LCD monitor having a resolution of 1024×768 or more, although the display 16 is not limited thereto. The display 16 is used for displaying results of operations by various programs.

The communication interface 17 is preferably connected to a network by the Ethernet® protocol, although the communication interface 17 is not limited thereto. The communication interface 17 receives a processing request in accordance with a communication protocol such as TCP/IP by means of a function that WebSphere® application server or the like provides from a client computer (not illustrated in the drawings), or returns a processing result to a client computer (not illustrated in the drawings).

A case will now be considered in which the computer 10 illustrated in FIG. 1 executes a program described by a class-based object-oriented programming language. In this case, according to the present embodiment a group of classes having an independent implementation is introduced, although the class group is handled as the same class from a user program. That is, a class group having a plurality of implementations that the computer 10 provides is prepared with respect to an existing class. In the present specification, the existing class is referred to as a "representative class" that defines an external interface. Further, a class having an implementation other than that of a representative class is referred to as a "specialized class".

In this case, it is assumed that the following relations exist between a representative class and a specialized class with respect thereto. A first relation is that although a subclass of a specialized class cannot be created, a specialized class can be newly created with respect to a subclass of a representative class. A second relation is that a representative class and specialized class group can access all members of one another. More specifically, it is possible for a representative class to access all members of a specialized class and it is possible for a specialized class to access all members of a representative class, and it is possible for a specialized class with respect to a representative class to access all members of other specialized classes (specialized classes in a fraternal relation) with respect to the representative class. The second relation also includes a relation that the specialized class is invisible from a class other than a class in the representative class and specialized class group. Further, the definition of a variable and a method of a specialized class is assumed to satisfy the following constraints so that an anomaly does not arise between a representative class and a specialized class with respect thereto.

A first constraint is that when a class variable that exists in a representative class is referenced with a specialized class, the class variable of the representative class is always referenced. A memory area that stores class variables is shared by the representative class and all the specialized classes.

A second constraint is that a non-private instance variable is arranged with the same layout for the entire representative class and specialized class group. The memory arrangement of an instance variable other than a private instance variable is made the same for the representative class and all of the specialized classes.

Therefore, based on the first constraint and the second constraint it can be said that a variable other than a private instance variable is the same for a representative class and a specialized class. A third constraint is that a non-private instance method has the same method table index for the entire representative class and specialized class group. A fourth constraint is that a variable or a method that exists in a representative class can be deleted with a specialized class only in a case where the relevant variable or method is private. That is, a non-private variable that exists in a representative class cannot be deleted, and a non-private method that exists in a representative class cannot be deleted. Note that it is possible to add a variable or a method in a specialized class.

In a class-based object-oriented programming language, implementation of an object is determined in accordance with the class definition of the relevant object. For example, the layout on a memory of an object is also determined in accordance with the class definition of the object. Therefore, a region for storing variables of an object is allocated at a position on the memory that is determined according to the class definition. However, there are also cases in which some variables of an object are not used depending on the values of the variables, and in such a case the memory usage amount can be reduced by adopting a configuration so that a region for storing the relevant variables is not allocated on the memory.

When it is desired to hold a plurality of object layouts for a single class in this manner, for example, according to Java®, an interface is used. However, when the implementation of a class, such as the Java® system class, that is already being used by many kinds of software is changed, the existing software will no longer operate. Further, if a change is made that alters external specifications with respect to the Java® system class, the compatibility as Java® will not be maintained. Although there are languages that can have unique classes for each object, such as the eigenclass of Ruby or a template-based language implementation such as JavaScript®, it is necessary for the programmer to explicitly use the unique classes for different purposes, and the classes cannot be used for optimizing existing code. There has been a demand to optimize the memory layout of objects while maintaining compatibility with existing software. In more general terms, there has been a demand to make the implementation of objects more efficient while maintaining compatibility with existing software. However, this demand has not been adequately satisfied. Note that, although the technology disclosed in Patent Japanese Patent Applications JP11-85492A, JP07-13766A, JP06-103075A, JP2011-233171A, and JP06-251163A relate to classes in a class-based object-oriented programming language, the technology disclosed in Patent Japanese Patent Applications JP11-85492A, JP07-13766A, JP06-103075A, JP2011-233171A does not suggest means for solving the problem described above. Further, although the respective technologies disclosed in Patent Japanese Patent Applications JP2002-259135A and JP2005-215830A optimize a program, these technologies can also not solve the above described problem. An object of the present invention is to make the implementation of objects more efficient while maintaining compatibility with existing software.

The processing unit can include: a first processing unit for performing processing using the second class in accordance with a predetermined instruction in the software that realizes the runtime system; and a second processing unit for performing processing using the first class in accordance with an instruction to check an identity of the second class in the user program that is executed by the runtime system.

In the aforementioned apparatus, if a class variable included in the second class is also included in the first class, the second class can refer to a class variable included in the first class as a class variable that is included in the second class. Further, as an instance variable that is accessible from outside the second class, the second class can include an instance variable with respect to which a relative arrangement position in the second class is identical to a relative arrangement position in the first class. In addition, as an instance method that is accessible from outside the second class, the second class can include an instance method with respect to which an index in a method table of the second class is identical to an index in a method table of the first class. Further, in the aforementioned apparatus, the predetermined instruction can be an instruction to generate an instance of a class group including the first class and the second class; and the first processing unit can generate an instance of the second class in a case where it can be determined that the second class is appropriate based on a value stored in the instance to be created, and can generate an instance of the first class in a case where it cannot be determined that the second class is appropriate based on a value stored in the instance to be created. In addition, the predetermined instruction can be an instruction to perform a garbage collection with respect to a memory for storing an instance of the first class, and the first processing unit can convert an instance of the first class to an instance of the second class in a case where it can be determined that the second class is appropriate based on a value stored in the first class.

According to the present embodiment, when creating an object of a class, a representative class or any specialized class is selected based on an initial value. In a case where an appropriate implementation can be determined based on an initial value, an instance of a specialized class with respect to the implementation is created. In contrast, in a case where an appropriate implementation cannot be determined based on an initial value, an instance of a representative class is created. Alternatively, when performing a garbage collection process, an instance of the representative class can be changed to an instance of an appropriate specialized class, or an instance of a specialized class can be changed to an instance of a more appropriate specialized class. For example, if the garbage collection is a copying scheme, an instance is changed in the above described manner when copying an object. Further, if the garbage collection is a mark-and-sweep scheme, an instance is changed in the above described manner when performing compaction.

In the present embodiment, the runtime system always returns class meta information of the representative class in a case where the user program references class meta information (for example, identity information of the class). More specifically, with respect to an instruction such as an "instanceof" bytecode, a "checkcast" bytecode and a "Class.getName( )" method, even in a case where a specialized class was passed as an argument, operations are performed as though a representative class was passed, and therefore the class meta information of the representative class is always returned. It is thereby possible to hide the existence of a specialized class from the user program.

Figure 2:
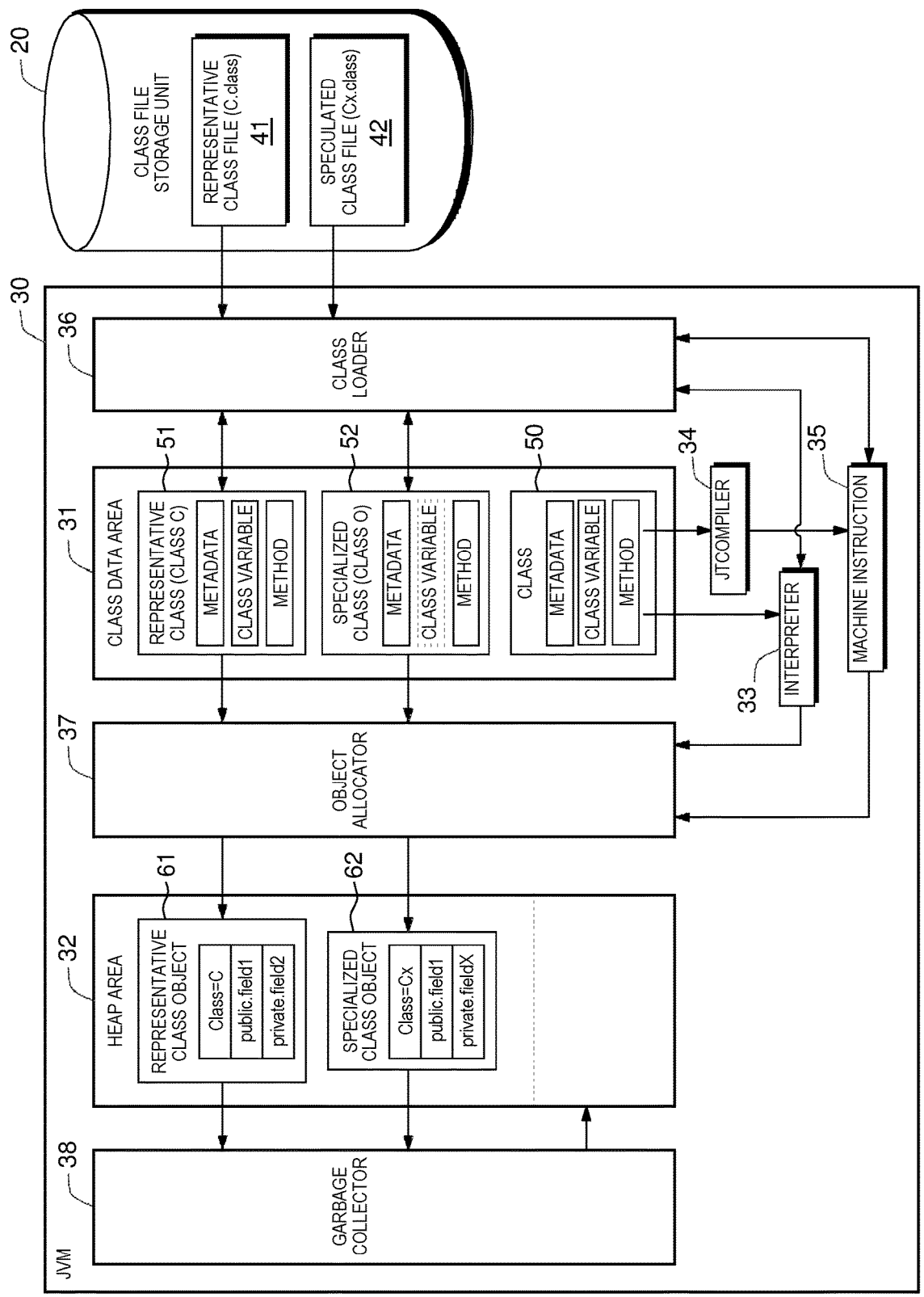
FIG. 2 is a block diagram illustrating an example of the functional configuration of the computer in an embodiment of the present invention.

Hereunder, a case is described in which a Java® virtual machine (hereunder, referred to as "JVM") is taken as an example of the runtime system. FIG. 2 is a view illustrating an example of a functional configuration for performing the above described operations of the computer 10 illustrated in FIG. 1. As shown in FIG. 2, the computer 10 includes a class file storage unit 20 and a JVM 30. The class file storage unit 20 stores class files that are files with the extension ".class" and that include Java® bytecode that is executable on the JVM 30. A class file of a representative class (hereunder, referred to as "representative class file") 41, and a class file of a specialized class (hereunder, referred to as "specialized class file") 42 are stored. The file name of the representative class file 41 is taken as "C.class" and the file name of the specialized class file 42 is taken as "Cx.class". The class file storage unit 20 is realized by means of, for example, the HDD 13 (see FIG. 1).

The JVM 30 is software that is executed after being converted to the native code of a platform onto which Java® bytecode was ported. Therefore, although the JVM 30 is software, in this case, for convenience the apparatus on which the software operates is described as the JVM 30. According to the present embodiment the JVM 30 is provided as one example of an apparatus that realizes a runtime system for an object-oriented programming language. The JVM 30 also includes a class data area 31 and a heap area 32. In addition, the JVM 30 includes an interpreter 33, a JIT (just-in-time) compiler 34, a machine instruction 35, a class loader 36, an object allocator 37 and a garbage collector 38.

The class data area 31 stores a class that was loaded from a class file stored in the class file storage unit 20. In this case, first, a class including a method that is a target for execution by the interpreter 33 or for compilation by the JIT compiler 34 is taken as a class 50. Note that, hereunder, this kind of method is also referred to as a "user program". The classes that are called when the interpreter 33 executes the method or when the machine instruction 35 obtained as a result of the JIT compiler 34 compiling the method is executed are taken to be a representative class 51 and a specialized class 52. In this case, since the file name of the representative class file 41 is "C.class" and the file name of the specialized class file 42 is "Cx.class", the representative class 51 is taken as class C and the specialized class 52 is taken as class Cx. In the present embodiment, the representative class 51 is used as an example of a first class that is an existing class, and the specialized class 52 is used as an example of a second class that is a class which is specialized for a specific use. Further, the class data area 31 is provided as an example of a storage unit for storing the first class and the second class.

The respective classes include metadata, a class variable, and a method. The metadata includes a class name of the relevant class, information relating to an instance variable of the class (for example, an offset of an instance variable), and a method table for calling an instance method of the class. Further, as described above, there is the first constraint that, when a class variable that exists in a representative class is referenced with a specialized class, the class variable of the representative class is always referenced. Accordingly, a class variable that exists in the representative class 51 does not exist in the specialized class 52. In FIG. 2, this fact is indicated by greying out a class variable inside the specialized class 52. In addition, as described above, there is the third constraint that a non-private instance method has the same method table index for the entire representative class and specialized class group. Because the class method of the representative class 51 is referenced when a class method that exists in the representative class 51 is referenced with the specialized class 52, a class method that exists in the representative class 51 does not exist in the specialized class 52. On the other hand, in some cases an instance method exists in both the representative class 51 and the specialized class 52. Accordingly, in FIG. 2, a method inside the specialized class 52 is not grayed out.

The heap area 32 stores objects of classes that are stored in the class data area 31. In this case, an object (hereunder, referred to as "representative class object") 61 of the representative class that was created by the object allocator 37 based on the representative class 51, and an object (hereunder, referred to as "specialized class object") 62 of the specialized class that was created by the object allocator 37 based on the specialized class 52 are stored.

The objects of the respective classes include information identifying the class and information of an instance variable. In this case, as described above, there is the fourth constraint that a variable or a method that exists in a representative class can only be deleted with a specialized class in a case where the relevant variable or method is private. Accordingly, although "public_field1" that is a non-private instance variable that exists in the representative class object 61 exists in the specialized class object 62, "private_field2" that is a private instance variable that exists in the representative class object 61 does not exist in the specialized class object 62. Furthermore, as described above, there is the second constraint that a non-private instance variable is arranged with the same layout for the entire representative class and specialized class group. Accordingly, "public_field1" that is a non-private instance variable is arranged first in both of the representative class object 61 and the specialized class object 62. Note that, as described above, since it is possible to add a variable in a specialized class, "private_fieldX" that is a private instance variable that does not exist in the representative class object 61 exists in the specialized class object 62.

The interpreter 33 is a program for executing a method of a class stored in the class data area 31 while successively interpreting the method. In this case, an example is illustrated in which, by executing a method of the class 50, the class loader 36 is requested to load the representative class 51 or the specialized class 52, and the object allocator 37 is requested to create the representative class object 61 or the specialized class object 62. Further, this example also illustrates the fact that when an instruction to check the identity of the representative class 51 or the specialized class 52 is detected as a result of executing the method of the class 50, the class loader 36 is requested to perform the relevant check, and the result of the check is received.

The JIT compiler 34 is a program for compiling a method of a class stored in the class data area 31 immediately prior to execution, and converting the method to the machine instruction 35. In this case, an example is illustrated in which a method of the class 50 is converted.

The machine instruction 35 is a series of instructions that the JIT compiler 34 generates by converting a method and that the CPU 11 (see FIG. 1) directly executes. In this case, an example is illustrated in which, by execution of the machine instruction 35, the class loader 36 is requested to load the representative class 51 or the specialized class 52, and the object allocator 37 is requested to create the representative class object 61 or the specialized class object 62. Further, this example also illustrates the fact that when an instruction to check the identity of the representative class 51 or the specialized class 52 is detected as a result of executing the machine instruction 35, the class loader 36 is requested to perform the relevant check, and the result of the check is received.

Upon receiving a request to load a class from the interpreter 33 or the machine instruction 35, the class loader 36 checks whether or not the relevant class is already loaded in the JVM 30. If the relevant class is not yet loaded in the JVM 30, the class loader 36 loads the relevant class into the JVM 30 from the class files stored in the class file storage unit 20. Note that, the representative class 51 and the specialized class 52 are available as classes to be loaded in this case. If the class loader 36 is requested by the interpreter 33 or the machine instruction 35 to check the identity of the representative class 51 or the specialized class 52, the class loader 36 performs the relevant check. The class loader 36 then returns the result of the check to the interpreter 33 or the machine instruction 35. Note that, at such time, even if the class loader 36 was requested to check the identity of the specialized class 52, the class loader 36 returns the information of the representative class 51 to the interpreter 33 or the machine instruction 35. In the present embodiment the class loader 36 is provided as one example of a second processing unit for performing processing in accordance with an instruction to check the identity of a class in a user program that is executed by a runtime system for an object-oriented programming language.

Upon receiving a request to create an object of a class from the interpreter 33 or the machine instruction 35, the object allocator 37 creates the relevant object of a class based on a class that is stored in the class data area 31. At such time, the object allocator 37 creates the relevant object of a class based on a class that is determined by the interpreter 33 or the machine instruction 35 among the representative class 51 and the specialized class 52. The object allocator 37 stores the created object in the heap area 32. In the present embodiment the object allocator 37 is provided as one example of a first processing unit for performing processing in accordance with a predetermined instruction in software that realizes a runtime system for an object-oriented programming language.

The garbage collector 38 performs a garbage collection process that deal locates areas in which objects that are no longer required were stored in the heap area 32. At such time, the representative class object 61 is converted to an object of a specialized class, or the specialized class object 62 is converted to an object of a different specialized class.

In the present embodiment the garbage collector 38 is provided as one example of a first processing unit for performing processing in accordance with a predetermined instruction in software that realizes a runtime system for an object-oriented programming language.

An implementation technique when the class loader 36 performs variable name resolution in the present embodiment will now be described in detail. First, name resolution with respect to a class variable will be described. When a class variable that exists in the representative class 51 is referenced by the specialized class 52, the class loader 36 always acquires the address of the class variable of the representative class 51. Further, when a private class variable that was added by the specialized class 52 is referenced, the class loader 36 acquires the address of the unique class variable of the specialized class 52.

Next, name resolution with respect to an instance variable will be described. The class loader 36 operates so that an offset of a non-private instance variable that exists in the representative class 51 becomes the same as an offset of the relevant instance variable in the specialized class 52. That is, the class loader 36 stores the same offset information in the metadata of the representative class 51 and of the specialized class 52. By this means, when the object allocator 37 stores an object in the heap area 32, instance variables are collected and disposed at the start of the object with the same offset in the representative class 51 and the specialized class 52. Further, when a private instance variable that exists in the representative class 51 is referenced by the specialized class 52, the class loader 36 stores information of a uniquely determined offset in the metadata of the specialized class 52. In addition, when a private variable that was added by the specialized class 52 is referenced also, the class loader 36 stores information of a uniquely determined offset in the metadata of the specialized class 52.

An implementation technique when the class loader 36 performs method name resolution in the present embodiment will now be described in detail. First, name resolution with respect to a class method will be described. When a class method that exists in the representative class 51 is referenced by the specialized class 52, the class loader 36 acquires the address of the unique class method of the specialized class 52. However, in a case where the specialized class 52 shares a class method of the representative class 51, the class loader 36 acquires the address of the method of the representative class 51.

Next, name resolution with respect to a virtual method among the instance methods will be described. The class loader 36 operates so that an index of a method table for calling a virtual method that exists in the representative class 51 and an index of a method table for calling the relevant virtual method in the specialized class 52 become the same. The class loader 36 stores the address of the method in the same index of a method table in the metadata of the representative class 51 and of the specialized class 52. When referencing a method that was added by the specialized class 52, the class loader 36 stores the address of the added method after the address of the method that exists in the representative class 51, in the method table in the metadata of the specialized class 52.

Name resolution with respect to a final method among the instance methods will be described below. Although in the original implementation of a JVM the class loader 36 acquires an address, in the present embodiment the class loader 36 performs similar operations as when performing name resolution with respect to a virtual method. The reason is that although in the original implementation of a JVM there is only one final method in the system, according to the present embodiment the final method can have a different implementation between the representative class 51 and the specialized class 52. Optimization of the interpreter 33 or the JIT compiler 34 is limited to allow a plurality of implementations of a class method and a final method to exist on the JVM 30.

An implementation technique for adjusting addresses of classes to improve efficiency in the present embodiment will now be described in detail. First, loading of classes by the class loader 36 will be described. The class loader 36 loads the specialized class 52 in an address range that is different to that for a normal class. At such time, the class loader 36 adjusts the addresses to which classes are loaded so that bit operations can be utilized. More specifically, the class loader 36 makes the high-order N bits of the address to which the representative class 51 is loaded and the high-order N bits of all addresses to which the specialized classes 52 are loaded the same. Further, the specialized classes 52 can be distinguished by lower-order M bits that follow the high-order N bits. Note that, at this time, it is sufficient to set 0 for all the lower-order M bits of the address to which the representative class 51 is loaded. Further, 0 is set for all the lower-order bits that come after the high-order N bits and the subsequent lower-order M bits. In this way, with respect to an instruction such as an "instanceof" bytecode, a "checkcast" bytecode or an "Class.getName( )" method, it is possible to return class meta information of the representative class 51 using only the high-order N bits of the address to which the class was loaded. Further, with respect to a request to access a class variable, by performing processing that takes out only the high-order N bits of the address to which the class was loaded and references the memory using the index from there, a class variable of the representative class 51 will always be accessed.

Next, storage of the machine instruction 35 by means of the JIT compiler 34 will be described. As an area for storing the machine instruction 35, the JIT compiler 34 allocates an area in which a number of fixed-length areas that correspond to the number of specialized classes 52 are linked. At such time, an offset of the fixed-length areas with respect to the specialized classes 52 is calculated based on the portion of M bits of the addresses of the specialized classes 52. More specifically, for each method, the JIT compiler 34 allocates a number of linked areas that correspond to the number of all of the specialized classes 52. Since the number of the specialized classes 52 is previously known, it is possible for the JVM 30 to allocate a continuous area. The code of a method of the specialized class 52 can be calculated by adding a value obtained by appropriately shifting the portion of M bits of the address of the specialized class 52 to an address acquired from the method table of the representative class 51. Accordingly, the method can be called faster than a virtual call with respect to which it is required to load the address. Note that when a code does not fit within the fixed-length area, it is sufficient to appropriately jump to a different area.

FIGS. 3A-3G are views that illustrate a first example of the representative class 51 and specialized classes 52. In this first example, the existing java.lang.String class is taken as the representative class 51, and seven specialized classes 52 are introduced with respect to the representative class 51.

FIG. 3A illustrates the implementation of the existing java.lang.String class. According to this implementation, a "value" field points to a char type array, and a 16-bit character string of an arbitrary length is stored in the array. However, with this implementation, if the character string is not long, there will be wastage in the array, and there will also be wastage in the respect that information such as the size of the array must be stored as a result of preparing the array. Further, the existing java.lang.String class has an "offset" field to facilitate trimming of part of the 16-bit character string that is stored in the array, and since this field is often not used, there are also cases in which providing this field constitutes wastage.

For example, let us consider a case of storing "abcd" that is an 8-bit character string in which the length of the character string is 7 or less. In this case, as shown in the implementation of a Variant #1 in FIG. 3B, it is sufficient to prepare a field with a size of 32 bits×2 and to store "length" (described as "Len" in the figure) and "a", "b", "c", "d" in this field.

Further, let us consider a case of storing "abcdefghi" that is an 8-bit character string in which the length of the character string is 15 or less. In this case, as shown in the implementation of a Variant #2 in FIG. 3C, it is sufficient to prepare a field with a size of 32 bits×4 and to store "length" (described as "Len" in the figure) and "a", "b", "c", "d", "e", "f", "g", "h", "i" in this field.

In addition, let us consider a case of storing "abcdefghijklmnop" that is an 8-bit character string in which the length of the character string is 23 or less. In this case, as shown in the implementation of a Variant #3 in FIG. 3D, it is sufficient to prepare a field with a size of 32 bits×6 and to store "length" (described as "Len" in the figure) and "a", "b", "c", "d", "e", "f", "g", "h", "i", "j", "k", "l", "m", "n", "o", "p" in this field.

On the other hand, let us consider a case of storing a hexadecimal character string or a character string encoded with Base64 up to 176 bits. In this case, as shown in the implementation of a Variant #4 in FIG. 3E, a field with a size of 32 bits×6 is prepared. Further, it is sufficient to store "length" (described as "Len" in the figure) and the number of bits ("bits") in the 16 bits in the first half of the first field and to store binary data corresponding to a character string from the 16 bits in the second half of the first field to the sixth field.

Further, let us consider a case of storing "−123456.78" that is composed of a packed decimal string up to 14 digits and a standard symbol that is used together therewith. In this case, as shown in the implementation of a Variant #5 in FIG. 3F, it is sufficient to prepare a field with a size of 32 bits×2 and to store "length" (described as "Len" in the figure) and "−1", "23", "45", "6.", "78" in this field.

In addition, let us consider a case of storing "+81−3−1234−5678" that is composed of a packed decimal string up to 30 digits and a standard symbol that is used together therewith. In this case, as shown in the implementation of a Variant #6 in FIG. 3G, it is sufficient to prepare a field with a size of 32 bits×4 and to store "length" (described as "Len" in the figure) and "+8", "1−", "3−", "12", "34", "−5", "67", "8" in this field.

FIGS. 4A-4D are views that illustrate a second example of the representative class 51 and specialized classes 52. In this second example, the existing java.math.BigInteger class is taken as the representative class 51, and three specialized classes 52 are introduced with respect to the representative class 51.

The implementation of the existing java.math.BigInteger class is illustrated in FIG. 4A. According to this implementation, a "digits" field points to an int type array, and a bit string of an arbitrary length is stored in the array. However, with this implementation, if the bit string is not long, there will be wastage in the array, and there will also be wastage in the respect that information such as the size of the array must be stored as a result of preparing the array. Further, the existing java.math.BigInteger class has a "numLength" field that shows the bit length and a "1stNonzeroDigit" field that shows the length until a first bit other than 0 appears, and consequently there is wastage with respect to these fields also in a case where the bit string is not long. For example, let us consider a case of storing a bit string having a bit length shorter than $2^{15}$. In this case, as shown in the implementation of a Variant #1 in FIG. 4B, it is sufficient to include "numLength" (described as "numLen" in the figure) and "1stNonzeroDigit" (described as "Non0Digit" in the figure) in a 32-bit size field. Further, let us consider a case of storing a bit string having a bit length shorter than 64. In this case, as shown in the implementation of a Variant #2 in FIG. 4C, it is sufficient to prepare two 32-bit size fields and store the $63^{rd}$ to $32^{nd}$ bits in the first field and store the $31^{st}$ to $0^{th}$ bits in the second field. In addition, it is sufficient to include "numLength" (described as "numLen" in the figure) and "1stNonzeroDigit" (described as "Non0Digit" in the figure) in a 32-bit size field.

Next, let us consider a case of storing a bit string having a bit length shorter than 128. In this case, as shown in the implementation of a Variant #3 in FIG. 4D, it is sufficient to prepare four 32-bit size fields and store the $127^{th}$ to $96^{th}$ bits in the first field, store the $95^{th}$ to $64^{th}$ bits in the second field, store the $63^{rd}$ to $32^{nd}$ bits in the third field, and store the $31^{st}$ to $0^{th}$ bits in the fourth field. In addition, it is sufficient to include "numLength" (described as "numLen" in the figure) and "1stNonzeroDigit" (described as "Non0Digit" in the figure) in a 32-bit size field.

FIGS. 5A-5C are views that illustrate a third example of the representative class 51 and specialized classes 52. In this third example, the existing java.math.BigDecimal class is taken as the representative class 51, and two specialized classes 52 are introduced with respect to the representative class 51.

The implementation of the existing java.math.BigDecimal class is illustrated in FIG. 5A. According to this implementation, an "intVal" field that shows a bit string that cannot be represented by a long type points to the implementation of the existing java.math.BigInteger class that is shown in FIG. 4A, and a "smallValue" field that shows a bit string that can be represented by a long type is also provided. However, according to this implementation, there will be wastage in the array in a case where a numerical value can be represented by a long type, and there will also be wastage in the respect that information such as the size of the array must be stored as a result of preparing the array.

For example, let us consider a case of storing a bit string having a bit length that is equal to or greater than 32. In this case, as shown in the implementation of a Variant #1 in FIG. 5B, the "smallValue" field need not be provided. Note that, in this case "bigInt" is adopted for "intVal" in FIG. 5A.

Further, let us consider a case of storing a bit string having a bit length shorter than 32. In this case, as shown in the implementation of a Variant #2 in FIG. 5C, the "intVal" field need not be provided. Note that, in this case "smallValueInt" is adopted for "smallValue" in FIG. 5A.

Figure 6:
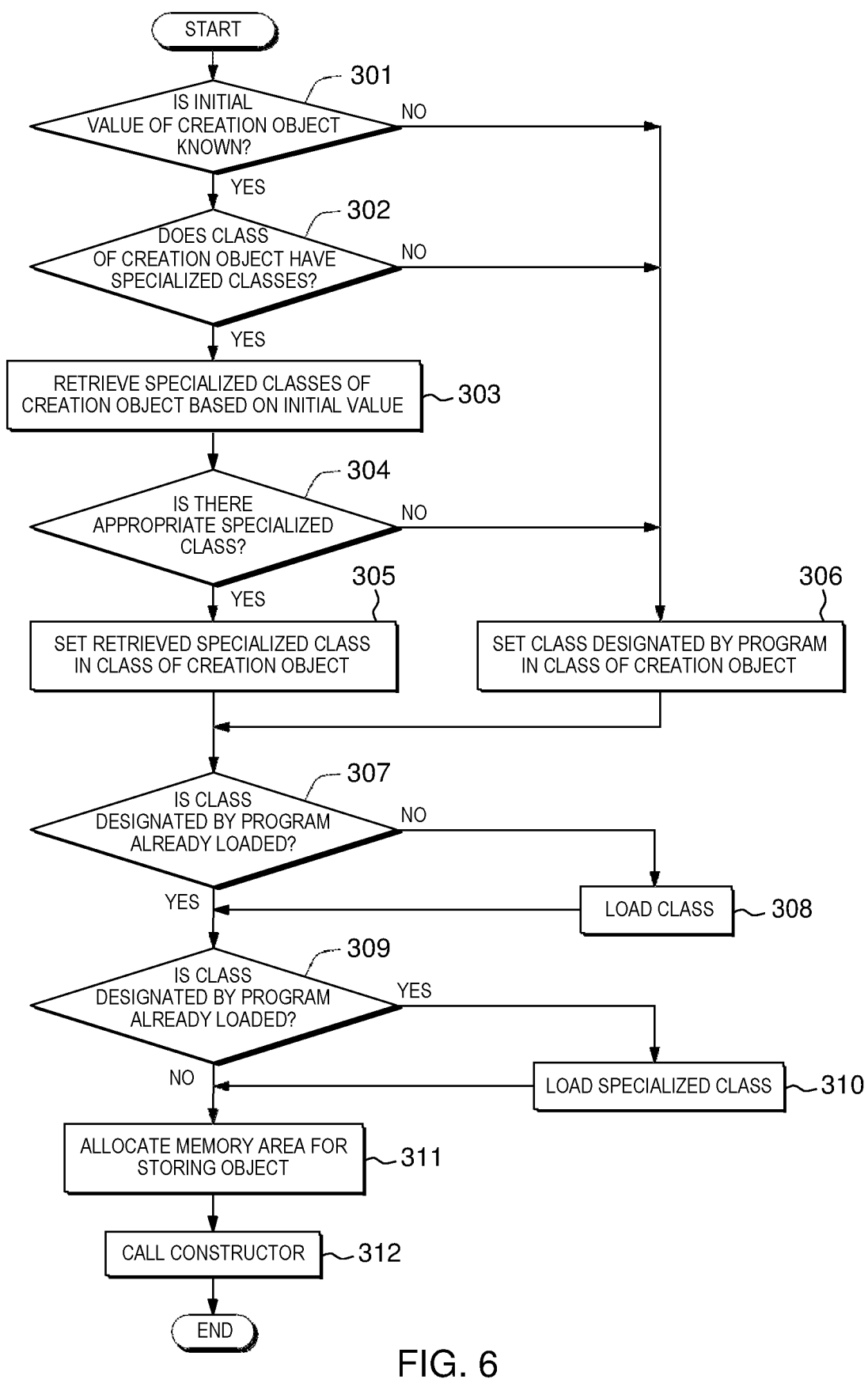
FIG. 6 is a flowchart illustrating an example of operations when creating a JVM object in an embodiment of the present invention.

FIG. 6 is a flowchart illustrating an example of operations of the JVM 30 when creating an object in the present embodiment. Note that this operation example is started when the interpreter 33 or the machine instruction 35 detect an instruction to create an object of a class group including the representative class 51 and the specialized class 52 from a user program (for example, a method of the class 50). Thus, although according to the present embodiment operations are started as a result of the interpreter 33 or the machine instruction 35 detecting an instruction, hereunder, operations of the JVM 30 are described on the assumption that the operations start as a result of the interpreter 33 detecting an instruction.

When the operations start, in the JVM 30, first the interpreter 33 determines whether or not an initial value of the object to be created (creation object) is known (step 301). This determination can be performed, for example, by analyzing the portions before and after the instruction to create an object of the user program. If it is determined that the initial value of the creation object is known, the interpreter 33 determines whether or not the class of the creation object has the specialized classes 52 (step 302). This determination can be performed, for example, by checking whether or not the specialized classes 52 are stored at other addresses having the same high-order N bits as the high-order N bits of the address of the representative class 51.

If it is determined that the class of the creation object has the specialized classes 52, the interpreter 33 retrieves the specialized classes 52 of the creation object based on the initial value which was determined as being known in step 301 (step 303). Next, the interpreter 33 determines whether or not there is an appropriate specialized class 52 (step 304). For example, as shown in FIG. 3B, if it is known that the initial value is "abcd", the interpreter 33 adopts the specialized class 52 of the Variant #1 of the java.lang.String class as the appropriate specialized class 52. If it is determined as a result that there is an appropriate specialized class 52, the interpreter 33 sets the relevant specialized class 52 in the class of the creation object (step 305).

In contrast, if it is not determined that the initial value of the creation object is known in step 301, if it is not determined that the class of the creation object has the specialized classes 52 in step 302, or if it is not determined that there is an appropriate specialized class 52 in step 304, the interpreter 33 sets a class designated by the user program in the class of the creation object (step 306).

Next, in the JVM 30, the class loader 36 determines whether or not the class designated by the user program is already loaded in the class data area 31 (step 307). If it is determined that the class designated by the user program is already loaded in the class data area 31, the processing proceeds directly to step 309. On the other hand, if it is not determined that the class designated by the user program is already loaded in the class data area 31, the class loader 36 loads the relevant class into the class data area 31 (step 308).

Next, the class loader 36 determines whether or not a specialized class 52 was set in step 305 but the relevant specialized class 52 is not yet loaded in the class data area 31 (step 309). In step 309, if the class loader 36 determines that the specialized class 52 was not set in step 305 or that the specialized class 52 that was set in step 305 is already loaded in the class data area 31, the processing proceeds directly to step 311. In contrast, if it is determined that the specialized class 52 was set in step 305 but the specialized class 52 is not yet loaded in the class data area 31, the class loader 36 loads the relevant specialized class 52 in the class data area 31 (step 310). Thereafter, in the JVM 30, the object allocator 37 allocates a memory area for storing an object of the class that was set in step 305 or step 306 (step 311). The object allocator 37 then calls a constructor (step 312). That is, processing is performed to create an object and initialize the object. Note that, according to this operation example, based on the premise that a plurality of the specialized classes 52 exist, in step 304 the most appropriate specialized class 52 among the plurality of specialized classes 52 is adopted as the appropriate specialized class 52. However, processing can also be performed in which, based on the premise that only one specialized class 52 exists, in step 304 the specialized class 52 is adopted as the appropriate specialized class 52 if the specialized class 52 is more appropriate than the representative class 51.

Figure 7:
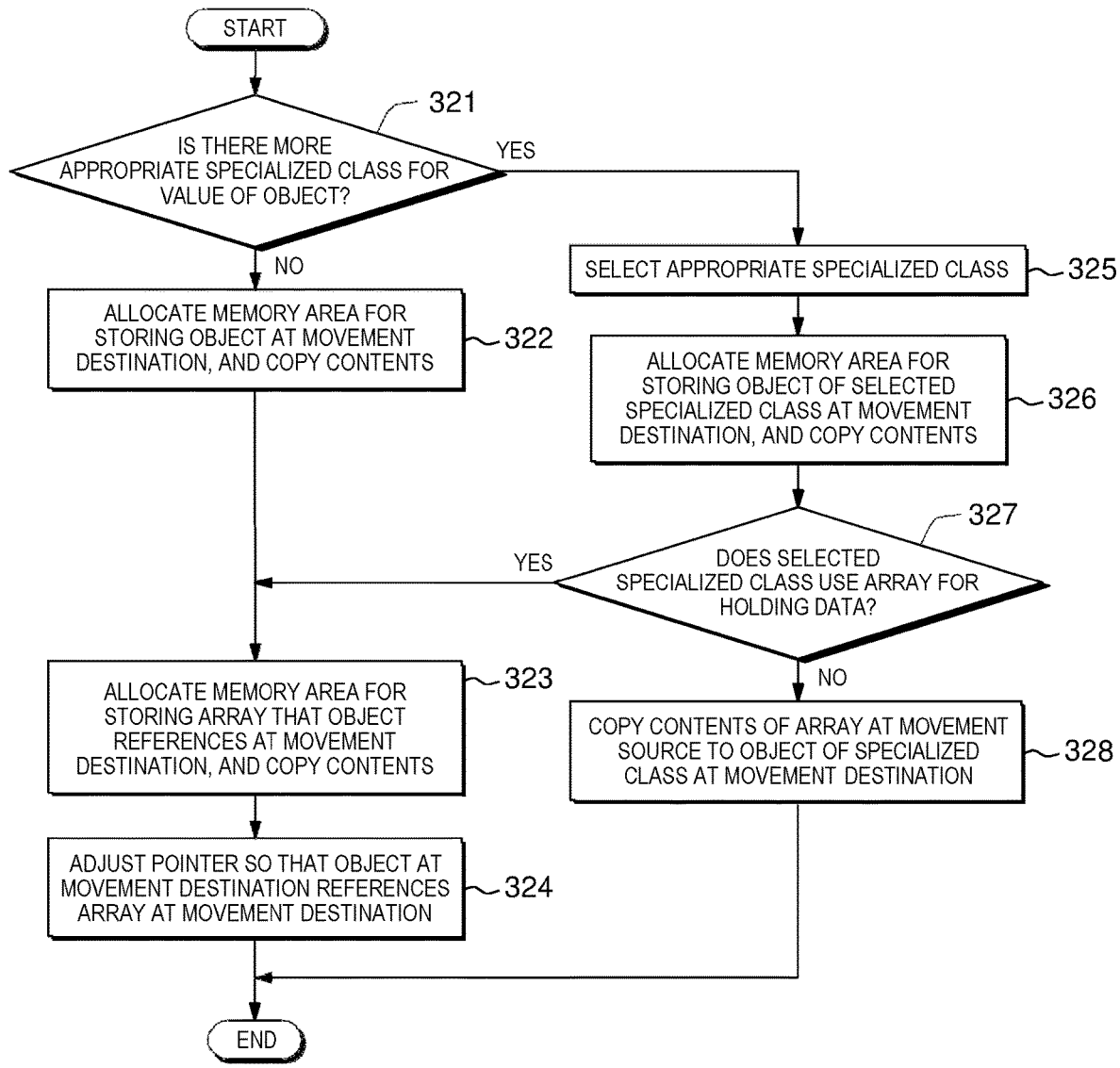
FIG. 7 is a flowchart illustrating an example of operations at the time of a garbage collection process of a JVM in the present embodiment.

FIG. 7 is a flowchart illustrating an example of operations of the JVM 30 at the time of a garbage collection process in the present embodiment. Note that, this operation example is executed with respect to the relevant object when the garbage collector 38 takes an object as a target of a garbage collection process. Further, in this case it is assumed that the class of the object that is the target of the garbage collection process references an array, and that in some cases the specialized classes 52 reference an array and in some cases the specialized classes 52 do not reference an array.

When the operations start, in the JVM 30, first the garbage collector 38 determines whether or not there is a more appropriate specialized class 52 with respect to the value of the relevant object (step 321). For example, the aforementioned determination can be performed by checking whether or not a specialized class 52 is stored at another address having the same high-order N bits as the high-order N bits of the address of the representative class 51, and that the value of the object satisfies a condition for using the relevant specialized class 52.

If it is determined that a more appropriate specialized class 52 with respect to the value of the object does not exist, the garbage collector 38 allocates a memory area for storing the object at a movement destination inside the heap area 32 and copies the contents of the object to the relevant memory area (step 322). Further, at a movement destination inside the heap area 32, the garbage collector 38 allocates a memory area for storing an array that the object references, and copies the contents of the array to the relevant memory area (step 323). Next, the garbage collector 38 adjusts a pointer so that the object that is at the movement destination references the array that is at the movement destination (step 324). On the other hand, if it is determined that there is a more appropriate specialized class 52 with respect to the value of the object, the garbage collector 38 selects the appropriate specialized class 52 (step 325). Next, the garbage collector 38 allocates a memory area for storing an object of the relevant specialized class 52 at a movement destination inside the heap area 32 and copies the contents of the object to the relevant memory area (step 326).

Further, the garbage collector 38 determines whether or not the selected specialized class 52 uses an array for holding data (step 327). If it is determined that the selected specialized class 52 uses an array for holding data, the garbage collector 38 allocates a memory area for storing the array that the object of the selected specialized class 52 references at a movement destination inside the heap area 32, and copies the contents of the array to the memory area (step 323). Next, the garbage collector 38 adjusts a pointer so that the object of the selected specialized class 52 that is at the movement destination references the array that is at the movement destination (step 324). In contrast, if it is not determined that the selected specialized class 52 uses an array for holding data, the garbage collector 38 copies the contents of an array that an object at the movement source references to the object of the specialized class 52 at the movement destination (step 328).

According to this operation example, based on the premise that a plurality of the specialized classes 52 exist other than the class of the object that is the target of the garbage collection process, in step 321 the most appropriate specialized class 52 among the plurality of specialized classes 52 is adopted as the appropriate specialized class 52. However, processing can also be performed in which, based on the premise that only one specialized class 52 exists other than the class of the object that is the target of the garbage collection process, in step 321 the relevant specialized class 52 is adopted as the appropriate specialized class 52 if the relevant specialized class 52 is more appropriate than the class of the object that is the target of the garbage collection process.

According to the present embodiment, as illustrated in the operation examples shown in FIG. 6 and FIG. 7, processing using a more appropriate specialized class 52 is performed in accordance with an instruction to create an object in the JVM 30 or an instruction to perform a garbage collection process. However, the present embodiment can be made more generalized so that processing using a more appropriate specialized class 52 is performed in accordance with a predetermined instruction in the JVM 30.

Figure 8:
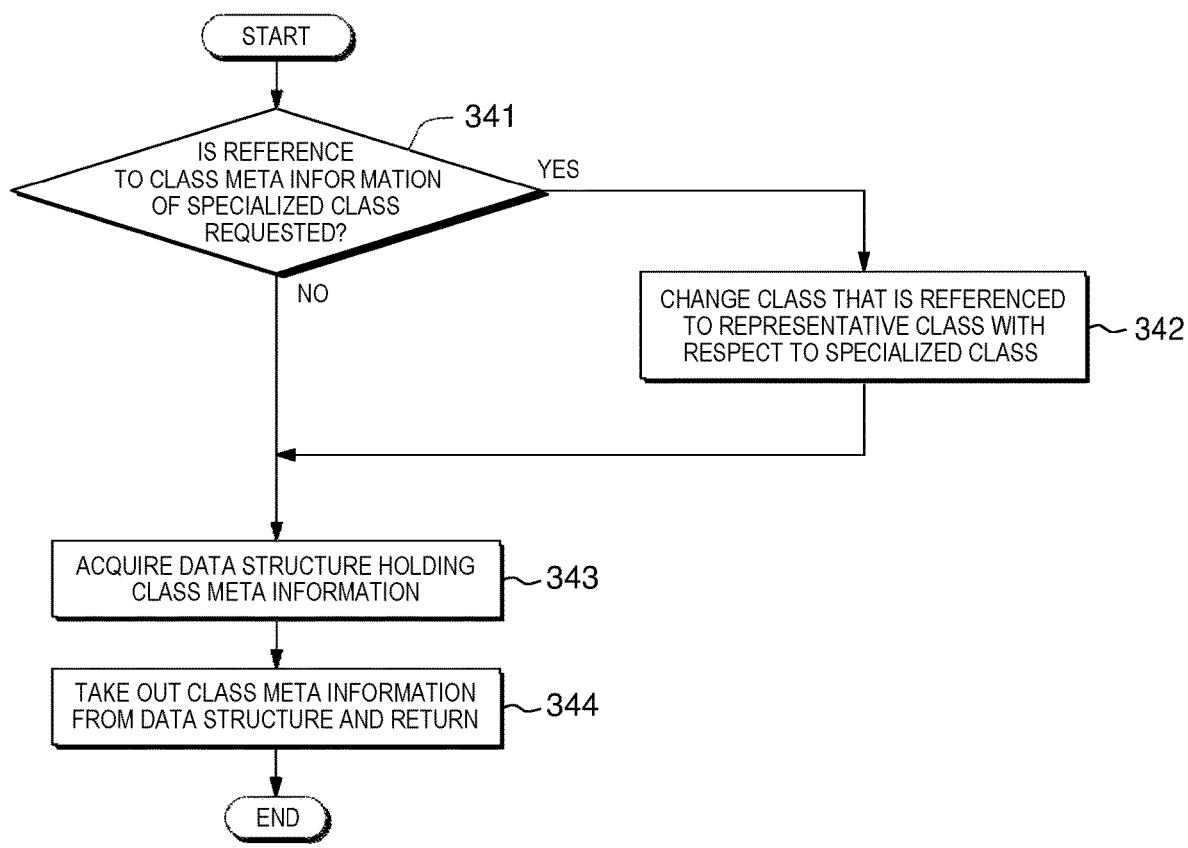
FIG. 8 is a flowchart illustrating an example of operations when providing class meta information of a JVM in the present embodiment.

FIG. 8 is a flowchart illustrating an example of operations of the JVM 30 when providing class meta information in the present embodiment. When the operations are started, in the JVM 30, first the class loader 36 determines whether or not there is a request by a user program to reference class meta information of the specialized class 52 (step 341). When the interpreter 33 or the machine instruction 35 detects an instruction that requests a reference to class meta information of the representative class 51 or the specialized class 52 from a user program (for example, a method of the class 50), the interpreter 33 or the machine instruction 35 conveys information to that effect to the class loader 36, and therefore the aforementioned determination can be performed based on the conveyed information.

In a case where, as a result, it is not determined that a reference to the class meta information of the specialized class 52 is requested by the user program, the processing proceeds directly to step 343. On the other hand, if it is determined that a reference to the class meta information of the specialized class 52 is requested by the user program, the class loader 36 changes the referenced class to the representative class 51 with respect to the specialized class 52 (step 342). Next, the class loader 36 acquires the data structure (metadata shown in FIG. 2) that holds the class meta information from the representative class 51 that the user program designated or from the representative class 51 after the change in step 342 (step 343). Thereafter, the class loader 36 extracts the class meta information for which the reference was requested from the acquired data structure, and returns the class meta information to the interpreter 33 or the machine instruction 35 (step 344).

FIG. 9 is a view illustrating effects of the present embodiment. Here, an example is illustrated in which the java.lang.String class shown in FIG. 3A is taken as the representative class 51, and the three kinds of specialized classes 52 shown in FIGS. 3B to 3D are introduced. In FIG. 9, results of analyzing a Java® heap dump after running DayTrader for 90 minutes are shown in the column with the heading "DayTrader (after 90 min run)". As shown in FIG. 9, when objects in use (live objects) were extracted, the size of the objects was 562 MB. On the other hand, the estimated memory reduction obtained by introducing the three kinds of specialized classes 52 was approximately 60 MB. Further, the estimated reduction from the Java® heap dump after running SPECjEnterprise for 90 minutes are shown in the column with the heading "SPECjEnterprise (after 90 min run)". According to this estimation, it is possible to achieve a reduction of approximately 31 MB with respect to the live heap of 373 MB. Thus, according to the present embodiment, it is possible to reduce the size of the live heap by approximately 10%. While the present invention has been described above using an embodiment, the technical scope of the present invention is not limited to that of the above described embodiment. It will be apparent to those skilled in the art that various changes and substitutions can be made without departing from the spirit and scope of the present invention.

What is claimed is:

1. An apparatus for realizing a runtime system for a class-based object-oriented programming language, comprising:
   a storage unit configured to store a first class that is an existing class in the class-based object-oriented programming language, and a second class that is a class that includes a member that is accessible from outside of the first class and that is a class which is specialized for a specific use, wherein the first class comprises a java.math.BigInteger class, and wherein the second class comprises a 32-bit field containing the bit length of the bit string and a length until a first non-zero bit appears in the bit string; and
   a processing unit configured to perform processing using the second class in accordance with a predetermined instruction in software that realizes the runtime system, wherein performing processing using the second class further comprises storing a bit string having a bit length less than 128, and further configured to perform processing using the first class in accordance with an instruction to check an identity of the second class in a user program product that is executed by the runtime system.

2. The apparatus according to claim 1, wherein the processing unit includes:
   a first processing unit configured to perform processing using the second class in accordance with a predetermined instruction in the software that realizes the runtime system; and
   a second processing unit configured to perform processing using the first class in accordance with an instruction to check an identity of the second class in the user program product that is executed by the runtime system.

3. The apparatus according to claim 2, wherein the predetermined instruction is an instruction to create an instance of a class group comprising the first class and the second class; and
   wherein the first processing unit is further configured to create an instance of the second class in a case where it is determined that the second class is appropriate based on a value stored in the instance of the second class to be created, and wherein the first processing unit is further configured to create an instance of the first class in a case where it cannot be determined that the second class is appropriate based on a value stored in the instance of the second class to be created.

4. The apparatus according to claim 2, wherein the predetermined instruction is an instruction to perform a garbage collection with respect to a memory for storing an instance of the first class; and
   wherein the first processing unit is further configured to convert an instance of the first class to an instance of the second class in response to determining that the second class is appropriate based on a value stored in the first class.

5. The apparatus according to claim 1, wherein for a class variable included in the second class that is also included in the first class, the second class references the class variable included in the first class as a class variable included in the second class.

6. The apparatus according to claim 1, wherein as an instance variable that is accessible from outside the second class, the second class includes an instance variable with respect to which a relative arrangement position in the second class is identical to a relative arrangement position in the first class.

7. The apparatus according to claim 1, wherein as an instance method that is accessible from outside the second class, the second class includes an instance method with respect to which an index in a method table of the second class is identical to an index in a method table of the first class.

8. A computer implemented method executed for realizing a runtime system for a class-based object-oriented programming language, the computer implemented method comprising:
 preparing a first class that is an existing class in the class-based object-oriented programming language, and a second class that is a class that includes a member that is accessible from outside of the first class and that is a class which is specialized for a specific use, wherein the first class comprises a java.math.BigInteger class, and wherein the second class comprises a 32-bit field containing the bit length of the bit string and a length until a first non-zero bit appears in the bit string;
 performing processing using the second class in accordance with a predetermined instruction in software that realizes the runtime system, wherein performing processing using the second class further comprises storing a bit string having a bit length less than 128; and
 performing processing using the first class in accordance with an instruction to check an identity of the second class in a user program product that is executed by the runtime system.

9. The computer implemented method according to claim 8, wherein for a class variable included in the second class that is also included in the first class, the second class references the class variable included in the first class as a class variable included in the second class.

10. The computer implemented method according to claim 8, wherein as an instance variable that is accessible from outside the second class, the second class includes an instance variable with respect to which a relative arrangement position in the second class is identical to a relative arrangement position in the first class.

11. The computer implemented method according to claim 8, wherein as an instance method that is accessible from outside the second class, the second class includes an instance method with respect to which an index in a method table of the second class is identical to an index in a method table of the first class.

12. The computer implemented method according to claim 8, wherein the predetermined instruction is an instruction to create an instance of a class group comprising the first class and the second class; and
 wherein the computer implemented method further comprises creating an instance of the second class in a case where it is determined that the second class is appropriate based on a value stored in the instance of the second class to be created.

13. The computer implemented method according to claim 8, wherein the predetermined instruction is an instruction to perform a garbage collection with respect to a memory for storing an instance of the first class; and
 wherein the computer implemented method further comprises converting an instance of the first class to an instance of the second class in a case where it is determined that the second class is appropriate based on a value stored in the first class.

* * * * *